April 27, 1965  C. C. POUNDS  3,180,674
COVER FOR PICKUP TRUCKS
Filed Dec. 31, 1963  2 Sheets-Sheet 1
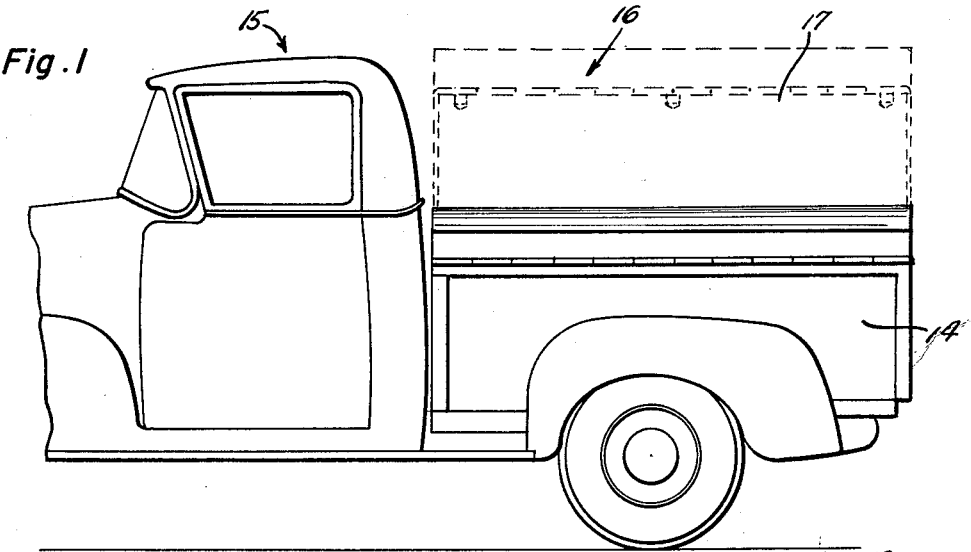
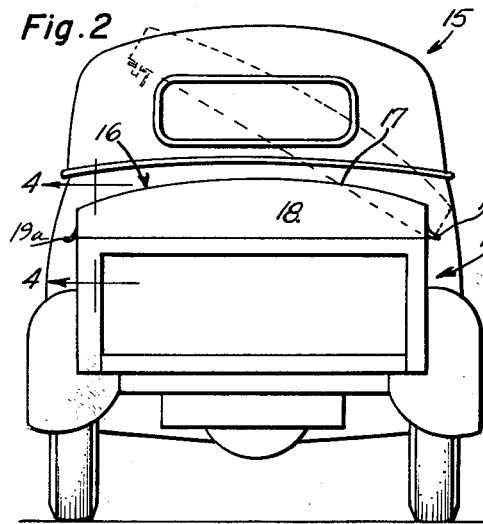
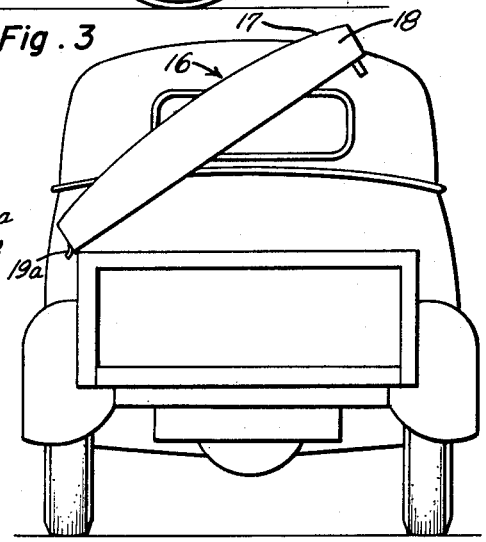
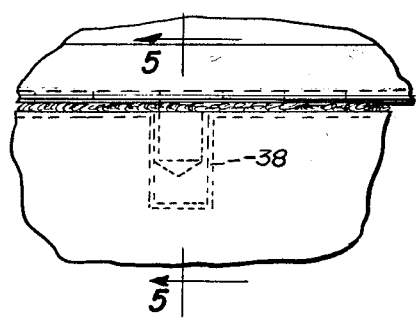
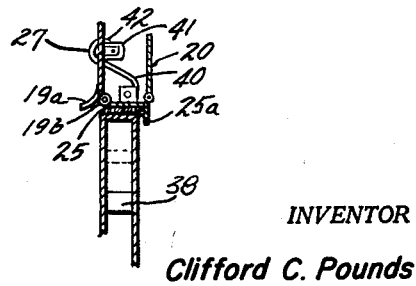
INVENTOR
*Clifford C. Pounds*

April 27, 1965 C. C. POUNDS 3,180,674
COVER FOR PICKUP TRUCKS
Filed Dec. 31, 1963 2 Sheets-Sheet 2
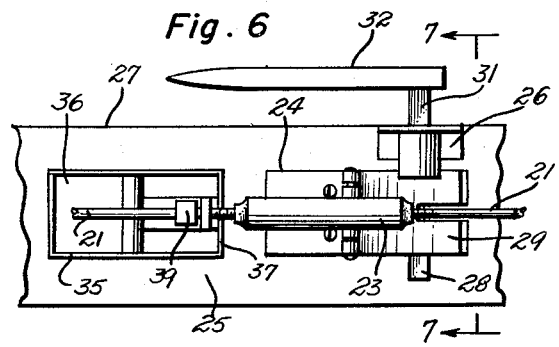
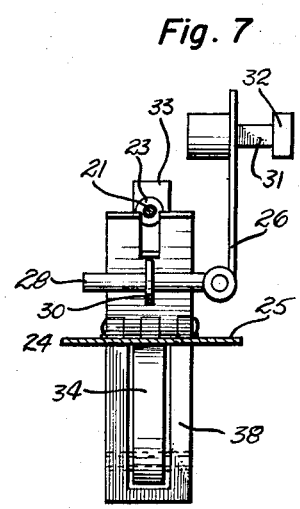
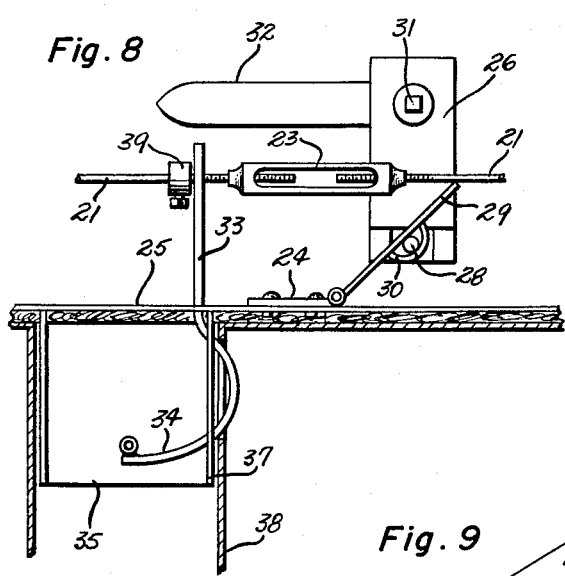
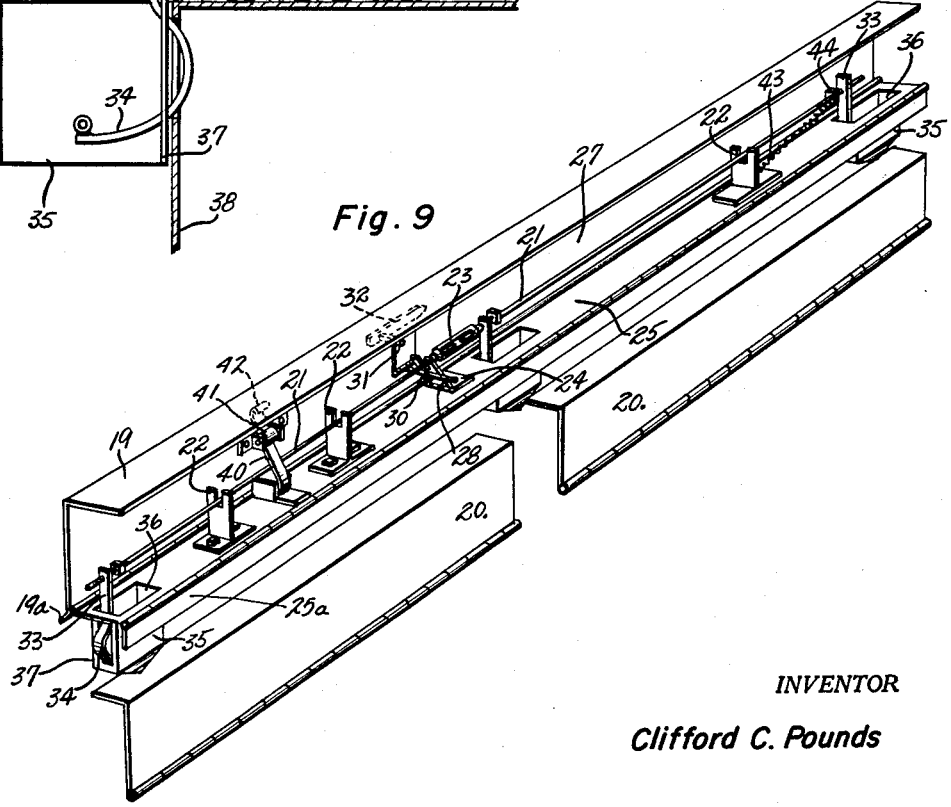
INVENTOR
Clifford C. Pounds

United States Patent Office 3,180,674
Patented Apr. 27, 1965

3,180,674
COVER FOR PICKUP TRUCKS
Clifford C. Pounds, P.O. Box 356, Post Falls, Idaho
Filed Dec. 31, 1963, Ser. No. 334,811
5 Claims. (Cl. 296—100)

This invention relates to vehicle bodies, and more particularly to that type of automotive vehicle having a truck body and known as a pickup truck.

As nearly everyone knows, pickup trucks are automotive vehicles having a body that is open back of the drivers cab.

While many people have pickup trucks for the hauling of items that are not affected by the weather, or operate them in climates in which there is little or no rain or snow, others have need for this type of vehicle but are handicapped by lack of a suitable cover for the same.

Covers now on the market for pickup trucks are usually the tarpaulin type that require some time to secure in place, and an equally long time to remove. This time consuming work is never pleasant when it is raining, snowing, or if the temperature is down below zero.

It is, therefore, the principal object of this invention to provide a cover for pickup trucks that can be quickly and easily put into place by reason of its new and novel latch construction, as will be hereinafter described.

Another object of this invention is to provide a cover for pickup trucks that will not interfere with one's vision through the rear window of the cab when the cover is in place.

Another object of this invention is to provide a cover for pickup trucks that does not require the drilling of any opening, or the attachment of any parts, in and to the body of the truck.

Another object of this invention is to provide a cover for pickup trucks that cannot accidentally become detached from the truck, with resultant possible loss of the cover, and/or damage to it, or loss of the truck's contents.

Another object of this invention is to provide a cover for pickup trucks that can be placed on or removed from any truck in approximately two minutes of time.

Still one more object of this invention is to provide a cover for pickup trucks that is so light in construction as to permit one person to handle the same, even in adverse weather.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view of a typical pickup truck with this invention of a cover shown in place in solid lines, and the cover raised from the left side in phantom lines.

FIGURE 2 is a back view of FIGURE 1, and showing in dash lines, the cover raised from the left side of the trucks.

FIGURE 3 is a back view of a typical pickup truck with this invention of a cover raised from the right side of the truck.

FIGURE 4 is a sectional view taken along line 4—4 of FIGURE 2.

FIGURE 5 is a sectional view taken along line 5—5 of FIGURE 4.

FIGURE 6 is a top view of FIGURE 8.

FIGURE 7 is a sectional view taken along line 7—7 of FIGURE 6.

FIGURE 8 is a side view of the assembled latch portion of this invention.

FIGURE 9 is a perspective view of the entire latching mechanism portion of this invention.

Referring now specifically to the drawings, the numeral 14 generally designates the body of a typical pickup truck 15. This invention of a cover for this type of truck is designated in its entirety by the reference numeral 16 and embodies a convex top portion 17 that is normally rectangular, when viewed from the top, and which has solid end pieces 18 that are suitably secured to the longitudinal housing member 19 that is basically U-shaped, when viewed from the end. This member 19 has its vertical portion 27 provided with an outwardly turned lower lip 19a and has hinge means 19b at the junction of the upright portion 27 of the member 19 and the lip 19a. The hinge means 19b connects a plate 25, which forms the lower wall of the member 19, to the upright portion 27. The plate 25 has a downturned guide flange 25a along its free edge. The flange 25a, as shown by FIGURE 5, extends down inside the side wall of the truck body to position the cover on the body.

A pair of guards 20, that appear as an inverted L-shaped member, are mounted on the inside of each longitudinal housing member 19 in order to protect its mechanism which is provided to lock each side of this cover down on the upper longitudinal edges of the aforesaid pickup body 14. The mechanism consists of a pair of longitudinally disposed rods 21 that are slidably mounted end to end on the plurality of vertically secured guides 22 that are mounted in longitudinal spaced relation on the lower flanged portion of the aforesaid member 19. The inward end of each one of the two rods 21 is threaded and screwed into the turnbuckle 23 which is located above the hinge guide member 24 that is also secured to the lower flanged portion or plate 25 of member 19. A crank member 26 is so mounted on the inside of the vertical or web portion 27 of the member 19 as to permit its, the crank's, horizontal arm 28 to project under one of the threaded inward ends of one of the rods 21, as well as under the angularly disposed portion 29 of the aforesaid hinge guide member 24, to which it is secured by the U-shaped member 30 on the underside thereof. The just mentioned crank member 26 is swingably held in place by the horizontal arm 31 that is provided with a handle 32 on the outside of the entire mechanism, as one can see by examining FIGURES 6 and 9 of the drawings.

Continuing to look at FIGURE 9, one will see that each end of the rods 21 is supported in part and threaded through an opening in the upper end of the vertical portion 33 of the catch 34 that is pivotally held in place in the rectangular pocket 35 that projects downward from the aforesaid plate 25. The plate 25 is provided with a rectangular opening 36 therein for the placement of the just mentioned catch 34 in the post or stake 35, which is provided with a rectangular opening in one end 37 for the outward projection of the catch, which engages one side of the stake pocket 38 on the body 14. The stake 35 is shown only in FIGURES 6, 8, and 9 of the drawings. An adjustable collar 39 is secured in place on the aforesaid rod 21 in order to make it possible for the catch 34 to be activated, as will be described later on in this specification.

Continuing to examine FIGURE 9, it will be seen that there are three of the just described catch mechanisms on the aforesaid longitudinal housing member 19, although this number can, of course, be changed according to the number of stake pockets the pickup truck body has; and this, of course, may vary with the make and model of the truck. Further examination of FIGURE 9 of the drawings shows that this, the aforesaid longitudinal housing member 19, is provided with a pivotally mounted recoil spring 40 that has one end secured to the lower flange 25 and the other end passing under the horizontally mounted roller 41 and projecting through an opening in the web portion 27 of the longitudinal member 19 and terminating in an inwardly curved end 42 on the outside of the longitudinal member 19. The purpose of this recoil spring 40 is to hold the plate 25 from swinging down when that side of the cover is raised so that the plate 25 is always positioned for snug re-entry of the longitudinal member 19 into the inside of the pickup body of the truck after the cover has been removed from the same and it is desired to place it back on top of the body again. The only other detail of this invention that has not yet been mentioned is the coil spring 43 that has one end secured to the collar 44 on one of the rods 21 and the other end secured to the lower flange 25 in order to provide the rod with the necessary holding tension in order that this device will properly function at all times.

It is now perfectly clear from both an examination of the drawings and the above detailed description of this invention that, when the cover 16 is placed on top of a pickup truck body, the entire assembly can be secured in place by lowering the rectangular pockets 35 down into the stake pockets 38 of the pickup body 14, where the device is securely held into place by the pressing action of the catch 34 against the inside of each one of the aforesaid stake pockets 3. The entire cover 16 can be quickly and easily removed merely by turning the previously described handle 32, that is located on each side of the cover, thereby depressing the catches 34, away from the inside of the aforesaid stake pockets 38, thus relieving the tension and making it possible for one to lift the cover 16 from the pickup body of the truck.

The foregoing is considered as illustrative only of the principles of the invention. Further, since numerous modifications and changes will readily occur to those skilled in the art, it is not desired to limit the invention to the exact construction shown and described, and accordingly, all suitable modifications and equivalents may be resorted to, falling within the scope of the invention as claimed.

What is claimed as new is as follows:

1. A cover for a body of pickup truck which has side walls and which has stake pockets in the tops of its side walls, said cover having side walls dimensioned to fit on the side walls of the body;
   said cover including post carrying plates along the side walls thereof, which plates are hinged to the side walls of the cover to swing about the lower edges of the cover side walls;
   each plate having depending posts fixed thereon insertible in the stake pockets of one of the body side walls to position the plate and cover thereon;
   said posts each having latch means therein normally expanded outwardly from the post to engage the pocket and hold the post in the pocket;
   each of the plates having a latch release mechanism thereon and connected with said latch means and movable to release said latch means; and
   the cover having manually operable means on the outside thereof extending through the cover and engageable with the release mechanism to move it in a direction to release the latch means.

2. The device defined in claim 1 wherein the plates and the cover are connected by spring means tending to hold the plate at right angle to the cover for seating on the pickup body.

3. The device defined in claim 1 wherein the cover side walls have longitudinal housing members forming the lower portions thereof, which housing members carry said plates; and
   inverted L-shaped guards are mounted on the inside of said housing members.

4. The device defined in claim 1 wherein said plates have down turned guide flanges along their free edges to position the plates on the body side walls.

5. The device defined in claim 1 wherein the cover side walls have out turned lips along their lower edges in juxtaposition to the hinged connections of the plates to the cover side walls; and
   the plates have down turned guide flanges along their free edges to position the plates on the body side walls.

References Cited by the Examiner
UNITED STATES PATENTS

| | | | |
|---|---|---|---|
| 976,572 | 11/10 | Jeffery | 296—35 |
| 1,543,532 | 6/25 | Timidaiski | 296—43 |
| 1,704,601 | 3/29 | Hall | 292—53 |
| 2,886,375 | 5/59 | Crawford | 296—100 |
| 3,012,814 | 12/61 | Penner | 296—100 |

FOREIGN PATENTS 1,030,699  5/58  Germany.

A. HARRY LEVY, *Primary Examiner.*